(12) United States Patent
Grott

(10) Patent No.: US 6,374,539 B1
(45) Date of Patent: *Apr. 23, 2002

(54) METHODS OF UTILIZING WASTE WATERS PRODUCED BY WATER PURIFICATION PROCESSING

(76) Inventor: Gerald J. Grott, 16220 N. 7th St., Unit 1151-47, Phoenix, AZ (US) 85022

( * ) Notice: Subject to any disclaimer, the term of this patent is extended or adjusted under 35 U.S.C. 154(b) by 0 days.

This patent is subject to a terminal disclaimer.

(21) Appl. No.: 09/565,735

(22) Filed: May 5, 2000

Related U.S. Application Data

(63) Continuation-in-part of application No. 09/110,789, filed on Jul. 6, 1998, now Pat. No. 6,071,411.

(51) Int. Cl.$^7$ ............................................. C09K 17/02
(52) U.S. Cl. ................................................ 47/58.1
(58) Field of Search ........................... 47/58.1; 210/638

(56) References Cited

U.S. PATENT DOCUMENTS

| | | | |
|---|---|---|---|
| 4,267,038 A | * | 5/1981 | Thompson .................. 210/638 |
| 5,121,708 A | * | 6/1992 | Nuttle .......................... 47/1.4 |
| 5,337,516 A | * | 8/1994 | Hondulas ........................ 47/65 |
| 5,491,157 A | * | 2/1996 | Spadafora et al. .......... 514/369 |
| 5,712,224 A | * | 1/1998 | Boyd et al. .................. 504/116 |
| 5,972,689 A | * | 10/1999 | Cook et al. ............ 435/252.31 |
| 6,308,457 B1 | * | 10/2001 | Howell ........................ 47/58.1 |

FOREIGN PATENT DOCUMENTS

JP   4-114988   *   4/1992

* cited by examiner

Primary Examiner—Charles T. Jordan
Assistant Examiner—Jeffrey L. Gellner
(74) Attorney, Agent, or Firm—Drummond & Duckworth

(57) ABSTRACT

The invention relates to disposing of unwanted waste waters produced from purifying water. The methods of the present invention include applying waste water containing 0.15% by weight of the salts of Na, K, Ca, Mg, Fe, Cl, $SO_4$, and $CO_3$ and mixtures thereof to soil to control dust, effect soil stabilization, seal ponds, inhibit root rot, and irrigate soil. The invention also relates to the utilization of waste waters within cooling towers and for laundry applications.

4 Claims, 9 Drawing Sheets

METHODS OF UTILIZING WASTE WATERS PRODUCED BY WATER PURIFICATION PROCESSING

RELATED APPLICATIONS

This application is a continuation-in-part application of USA application Ser. No. 09/110,789 filed on Jul. 6, 1998 now U.S. Pat. No. 6,071,411.

BACKGROUND OF THE INVENTION

The present invention relates to methods for economic utilization of waste waters produced from water purification processing.

Water purification typically produces a first effluent of relatively "clean water" and a second effluent of "waste water" which include unwanted contaminates. The softening of hard water by the removal of calcium and magnesium is required for both industrial and household use. Known water softening processes proceed either by way of ion-exchange, membrane softening or precipitation. In the ion-exchange processes, the calcium ($Ca^{2+}$) and magnesium ($Mg^{2+}$) ions are exchanged for sodium ($Na^+$) and regeneration of the ion-exchange resin is achieved with a large excess of NaCl. This processes creates a regeneration effluent being a relatively concentrated aqueous solution of sodium, calcium and magnesium chlorides which has to be discarded. Consequently, by this method, considerable amounts of sodium, calcium and magnesium salts in solution must be disposed of.

Alternatively, it is possible to use weak acid resins which exchange hydrogen ($H^+$) for calcium ($Ca^{2+}$) and magnesium ($Mg^{2+}$), and to regenerate the spent resins with a mineral acid. While this method creates less waste water, it is more expensive and yields relatively acidic soft water which is corrosive. Meanwhile, membrane softening concentrates the calcium, magnesium salts and salts of other divalent ions to produce waste waters which require costly disposal.

The precipitation process has traditionally been carried out by the "lime soda" process in which lime is added to hard water to convert water soluble calcium bicarbonate into water insoluble calcium carbonate. This process also results in waste water which is difficult to filter and requires cumbersome treatment.

My previously issued patent, U.S. Pat. No. 5,300,123 (which is incorporated herein by reference), relates to the purification of impure solid salts. Even this process produces salty waste water which must be disposed of.

The disposal of waste water has become an expensive problem for society. For example, approximately 1.61 billion gallons of waste water containing approximately 800,000 tons of mixed sodium, calcium, magnesium chlorides and sulfates is produced from water treatment operations and oil fields in the state of California alone. This waste water must be disposed of, costing the state of California millions of dollars each year. Meanwhile, the disposal of waste water has become even more problematic in other parts of the world. As a result, billions of dollars are spent each year toward efforts to dispose of waste waters. Accordingly, it would be highly advantageous to provide improved methods of disposing of salty waste waters. It would even be more advantageous to provide methods of utilizing salty waste waters which provide a benefit to society, instead of simply disposing of the unwanted waste waters.

Wind erosion of soil is also significant problem throughout the world. Due to small particle size and poor cohesion, finely divided soil is sensitive to the influence of wind. Such finely divided soil is found in agricultural lands, dunes, lake beds, construction sites and roads under construction. Erosion by wind causes the drifting of masses of soil in the form of dust. The erosion by wind causes the inconvenience of dust formation and the loss of valuable matter such as seed, fertilizer and plantlets. Dust storms are a danger to traffic and a health risk to persons located in the vicinity.

Moreover, the effects of wind erosion on soil can be enhanced by the influence of the sun and rain. The sun causes the evaporation of moisture from soil thereby reducing the cohesion of finely divided soil. Erosion of the soil by rain is caused by rain washing away soil. This is a particular problem when agricultural soil is washed away, damaging plant life and making the soil unusable for agricultural purposes. Further, due to the influence of erosion by rain, the unprotected slopes of ditches, channels, dunes and roads may collapse or be washed away.

Therefore, it is extremely important to prevent the effects of the sun, wind and water in eroding soil. As used herein, soil stabilization refers to the treatment of soils with chemicals to offset the tendencies of soils to be sensitive to small changes in the types of ions in the soil moisture as they effect the plasticity of the soil. For example, swelled clays, those with layers of "bound" water molecules, are more susceptible to movement under load. Soil stabilization of swelled clays can be effected by altering the types and/or amounts of ions in the soil mixture.

It has been proposed to prevent the shift, drift and erosion of soil by treating the surface layers of the soil with water dispersible high polymeric substances of a natural or synthetic nature. Examples of these high polymeric substances include starch ethers, hydrolyze polyacrylonitril, polyvinyl alcohol and carboxymethyl cellulose. U.S. Pat. No. 3,077,054 discloses the use of polyvinyl acetate as an anti-erosion agent. U.S. Pat. No. 3,224,867 teaches the conditioning of soil with mono starch phosphate. U.S. Pat. No. 5,125,770 teaches treating the soil with a pre-gelatinized starch and a surfactant compound. Furthermore, it has been known to treat dirt roads with relatively pure solid sodium chloride (NaCl), calcium chloride ($CaCl_2$), and mixtures of the two.

There are several drawbacks with the aforementioned soil treating compounds. The polymers mentioned have a relatively high price and have potentially harmful environmental properties. In addition, the starch ethers have proved sensitive to washing out by rain water. As a result, their effectiveness as an anti-erosion agent is severely limited.

An additional problem encountered throughout the world involves fungus. There are millions of acres of land in California, Arizona, New Mexico, Texas and the Sonora and Sinaloa areas of Mexico where crop production is almost impossible due to fungus which attack virtually all dicotyledonous plants of which there are more than 2,000 species. These include cotton, alfalfa and citrus trees. The lack of productivity is due to excessive calcium carbonate in the soil which minimizes swelling to the point that carbon dioxide from decaying humus concentrates to more than about 3.2% $CO_3$, where fungus thrives. These fungus, primarily *Phytomatotrichum omnivorim* (Shear) Duggar, have three stages of development called the mycelium, conidium and scelerotia. The first stage, referred to as mycelium, involves the development of a fine filament which branches out throughout the soil and forms a tight web around plant roots. After the filament reaches the soil surface, a white mat forms on the surface, referred to as conidium. When mature, the mycelium develops multicellular bodies called scelerotia which can extend to a depth of up to twelve feet into the soil.

About 1970, it was discovered that the addition of sodium to soil offset the excess calcium in the soil. This increased the soil permeability and avoided the build-up of carbon dioxide that permits the root rot to flourish. Sodium chloride has been applied where the soil drains readily and the excess chloride and sodium are leached away by rainfall or irrigation. Meanwhile, sodium sulfate is preferable because 1) the sulfate supplies the nutrient sulfur, 2) the sulfate combines with calcium to form gypsum and gypsum soils typically do not support root rot, 3) gypsum buffers excess sodium assisting its leaching from the soil, and 4) there is no additional chloride residue which can leach into the water table. Unfortunately, sodium sulfate has always been too costly to be used to treat soil for farming. Recently, it has been suggested that solid mixtures of salts removed from water softening processes can be used to control root rot. However, salts removed from water softening are still relatively expensive and the process of utilizing salts recovered from waste water has not been adopted within the agricultural community.

Still an additional problem encountered in agriculture is that soil is often too high in sodium and/or too high in salinity. Farmland and irrigation water is often unacceptably high in sodium. Irrigation waters containing high amounts of sodium salts versus calcium and/or magnesium salts can create a buildup of sodium in the soil. This excess soil results in the dispersion of soil colloidal particles and an increase in soil pH. The dispersion of colloidal particles causes the soil to become hard and compact when dry and increasingly resistant to water infiltration and percolation. The sodium rich soil also becomes resistant to water penetration due to soil swelling when wet.

The total salinity of soil and irrigation water is also of concern. Salinity refers to the total salts within the water, with the significant positive ions (cations) in salinity being calcium, magnesium and sodium and the significant negative ions (anions) being chloride, sulfate and bicarbonate. All irrigation water contains some dissolved salts. When soil has a high content of dissolved salts, or the irrigation waters have sufficient salts to increase the salinity of the soil, the soil has the tendency to hold the water instead of releasing the water for absorption by plant roots by osmotic pressure. Even if the soil contains plenty of moisture, plants will wilt because they cannot absorb necessary water.

Ironically, though there is an overabundance of waste waters that are contaminated with the salts of Na, K, Ca, Mg, Fe, Cl, $SO_4$, and $CO_3$ that, as discussed above, is extraordinarily expense to dispose of, millions of dollars are spent each year on salts such as sodium chloride for deicing highways. It would thus be advantageous if the salts in waste water could be used for deicing highways.

It would also be highly desirable to provide a method for treating soil that is of low cost and utilizes a material or compound which is readily available. It would be even more advantageous if salty waste waters could be used to treat soil to control dust and effect soil stabilization.

It would also be desirable to provide a method inhibiting root rot in soil.

Moreover, it would be desirable to provide a method of maintaining the proper salinity levels and salinity equilibrium in soil to enhance the agricultural properties of soil.

Finally, it would be desirable if all of the aforementioned objectives could be accomplished while overcoming an expensive and problematic concern facing this country and the rest of the world, the disposal of waste waters.

SUMMARY OF THE INVENTION

Briefly, in accordance with the invention, I provide methods for economically and efficiently utilizing the waste waters produced by water purification and particularly those produced from oil and gas wells, and irrigation drainage. To this end, my invention is so successful, the effluents produced from water purification should no longer be referred to as "waste" waters at all.

I have learned that by applying the waste water from water purification, such as water softening processes, upon soil provides an excellent means for controlling dust from wind blown soil and for effecting soil stabilization. More particularly, I have learned that the direct application of the salty waste waters from water purification and water softening processes is effective in treating industrial clays; controlling dust; stabilizing load bearing soils such as foundations, road beds, etc. I have also learned that the direct application of waste waters to soil can be applied in similar manner to seal soil surfaces for pond sealing.

The waste waters of the present invention are any waters which are produced as a result of the purification of water, and particularly purified "oil field produced waters" and irrigation drainage, which results in a first effluent of clean water and a second effluent of a waste water, which typically must be disposed of. As defined herein, clean water refers to water which has been treated by one or several methods for public or industrial use. For example, in the drinking water industry, clean water is the final delivered water. Typical water purification processes and water softening processes of the present invention include reverse osmosis, electro dialysis, distillation, evaporation, ion exchange and lime softening. These processes create waste water having various levels of salt content. For the purposes of this invention, I define "waste water" as water containing about 0.15% or more by weight of the salts of Na, K, Ca, Mg, Fe, Cl, $SO_4$, and $CO_3$ or a combination thereof. Prior to the practice of my invention, the waste water from any of these processes was expensive to dispose of.

I have also learned that waste waters produced from water purification, particularly those high in calcium, magnesium, iron and sulfates, can also be used to control dust and to irrigate farm land, or as additive to irrigation waters, where the soil has a high sodium content.

In addition, I have discovered that, conversely, waste waters which have a high sodium content are particularly suitable for soil stabilization, pond sealing and treating root rot. These high sodium waste waters are also suitable for use in cooling towers and laundry applications.

Moreover, I have discovered that waste waters can be processed to create both solid and aqueous mixtures which can be applied to roads and highways for deicing and for reducing the tendency of water to form into ice on roads and highways.

The waste water may be applied to the soil by any means commonly known in the art. For example, the waste water may be applied by spraying from the back of a truck or other type of construction or farm equipment. In addition, the waste water may be applied to the soil by slow moving aircraft.

Accordingly, it is an object of the invention to provide cost effective means of disposing of waste water produced from the purification of water. To this end, it is a principal object of the invention to provide new methods for utilizing waste water produced from water purification.

It is an additional object of the present invention to provide new methods for stabilizing soil and controlling dust from soil.

It is still another object of the present invention to provide new methods for treating soil to reduce root rot in soil to provide previously unuseable land for farming.

Furthermore, it is an object of the present invention to provide new methods for irrigating soil to provide proper sodium and salinity levels for agriculture.

In addition, it is an object of the present invention to provide to methods of for providing solid and liquid mixtures for deicing roads and highways.

These and other, further and more specific objects and advantages of the invention will be apparent to those skilled in the art from the following detailed description taken in conjunction with the drawings.

DETAILED DESCRIPTION OF THE PREFERRED EMBODIMENTS

Figure 1:
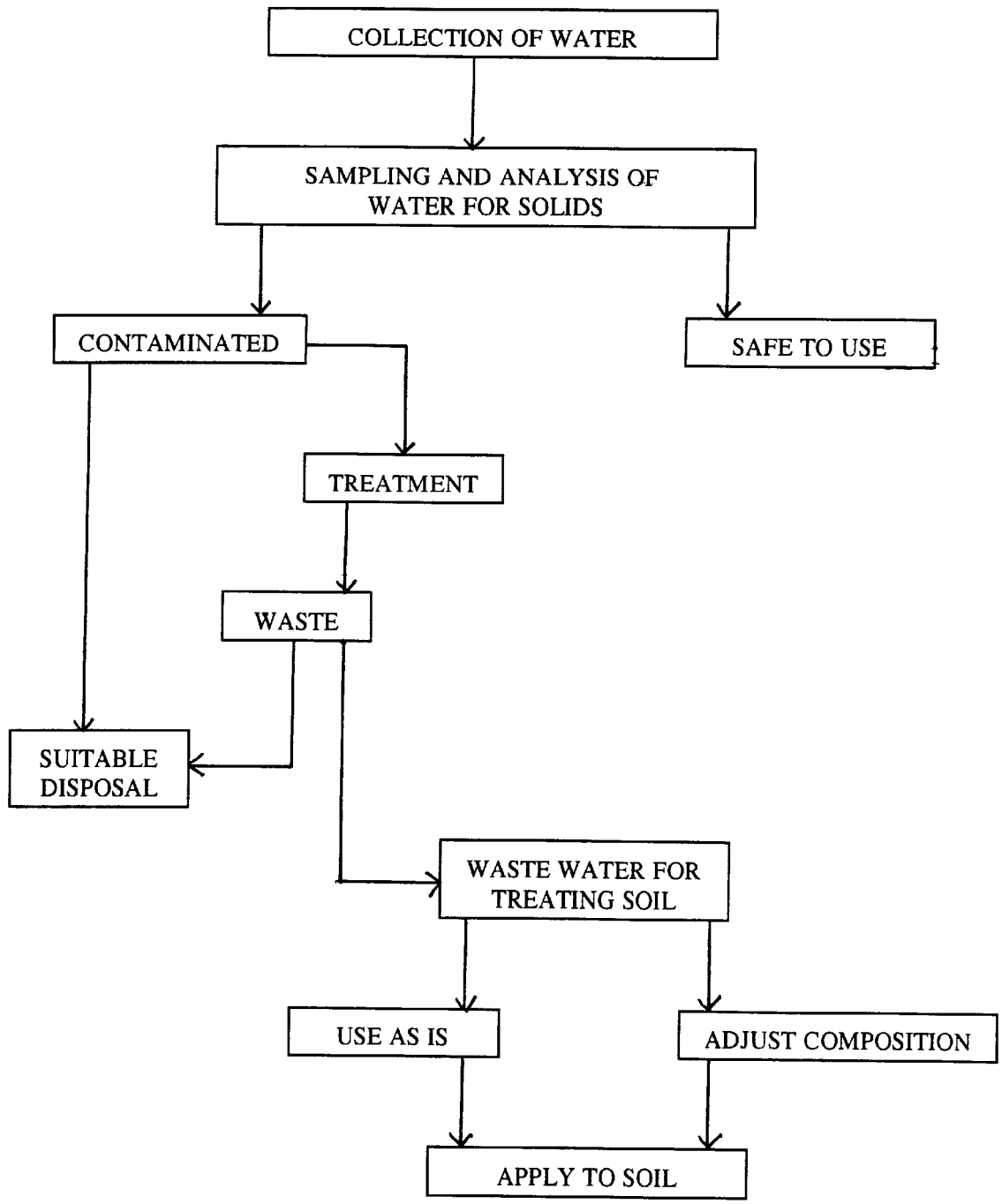
FIG. 1 is a flow chart of the preferred method of the invention.

While the present invention is susceptible of embodiment in various forms, as shown in the drawings, hereinafter will be described the presently preferred embodiments of the invention with the understanding that the present disclosure is to be considered as an exemplification of the invention and it is not intended to limit the invention to the specific embodiments illustrated.

Water softening is the removal of the "hardness" from the water which means predominantly removing or altering the calcium and magnesium ions from the water. These calcium and magnesium ions combined with carbonates, sulfates, oils and fat to create bathtub scum, spotted dishes, gray sheets, etc. In addition, unsoftened water has been found to cause scaling of industrial water heaters and commercial boilers causing early substantial energy losses through impaired heat transfer and early shutdown for the removal of scale. Several methods for effecting water softening are known. The best known process for softening water is "ion-exchange". Ion-exchange entails the exchange of sodium, which is introduced into water, for calcium, magnesium, iron and other divalent mineral ions which are transferred out of the water and into a resin. When the resin approaches saturation with these hard ions, the resin is regenerated most often with solutions of sodium chloride leaving an effluent containing 3 to 25% sodium, calcium and magnesium salts which must be disposed of. The exact concentration of the effluent depends on the shop practice and, in particular, on the amount of rinse water included in the effluent, if any. Less often mineral acids like sulfuric acid or hydrochloric acid are used for water softening and these also produce effluents. Conversely, reverse water softening also involves ion exchange in which calcium and magnesium into the water to separate sodium Membrane systems have recently become economically feasible. These systems, such as electro dialysis and reverse osmosis, include the use of a membrane which also produces a salty effluent. For critical uses such as electronics, and particularly for use in the manufacture of computer chips, the first product of clean water may be further purified by dual bed or mixed bed ion-exchange treatment. This "polishing treatment" also produces an effluent containing the removed salts.

Each of these water purifying processes produce a clean water effluent and a waste water effluent which is expensive and difficult to dispose of. Moreover, in U.S. Pat. No. 5,300,123, I disclose a method for reducing the soluble and insoluble impurity levels in salt. In the practice of this invention, salt crystals are initially reduced in size by fine grinding the crystal mass. The crystal mass is then added to a substantially saturated solution of salt and the strain induced in fine grinding process causes them to dissolve in the substantially saturated solution to the extent that the solution becomes supersaturated and new purified crystals form and grow. This dissolving and reforming is continued until substantially all of the original finely ground particles of salt have dissolved and reformed as new purified crystals. The new purified crystals are separated by size from the solution and rinsed, while the fine insoluble impurities which do not grow appreciably, if at all, remain in the now impure solution of sodium, calcium and magnesium chlorides, along with minor impurities from the original waste salt.

I have learned that the waste water produced from water purification and water softening processes, and the calcium and magnesium substantially saturated solution produced in practicing my invention disclosed in U.S. Pat. No. 5,300,123, can be effectively used as soil amendments to control dust and effect soil stabilization. The chemical and physical properties of clays and soils have ion-exchange properties which are determined in great part by their contact with water soluble chemicals. Chemicals having particular influence on the physical properties of soil are sodium, potassium, calcium and magnesium because these are common cations. The most common anions found in soils are chloride, sulfate, carbonate and bicarbonate. The concentration, and relative concentration, of the various dissolved ions determine the activity of the exchangeable ions attached to soil particles. Thus, it is possible to alter and regulate the behavior of soils by controlling the ratio and amount of the various ions applied to the soils.

More particularly, I have found that waste waters having increase sodium or potassium have much greater effectiveness in stabilizing soils than the calcium and magnesium salts. Moreover, I have discovered that waste waters high in sodium are also effective to control root rot.

Conversely, I have found that the calcium and magnesium chlorides in waste waters have much greater effectiveness in controlling dust from wind blown soil than the sodium salts. I have also found that, in general, the calcium and magnesium salts do not noticeably interfere with the sodium chloride's ability to stabilize soils, while the sodium salts do not reduce the effectiveness of calcium and magnesium chlorides for dust control. Moreover, the calcium and magnesium salts are effective for irrigating farm land, particularly where the sodium absorption ration needs to be adjusted.

For the purposes of this invention, "waste water" is defined as any water containing sufficient salts as to have no acceptable use due to costs or contamination levels. In general, waste water containing about 0.15% or more by weight of the salts of Na, K, Ca, Mg, Fe, Cl, $SO_4$, and $CO_3$, or combinations thereof are considered as having no acceptable use and must be disposed of.

With reference to FIG. 1, in a preferred embodiment, water is collected which is contaminated with salts including Na, K, Ca, Mg, Fe, Cl, $SO_4$ and $CO_3$. The contaminated water is purified by any means known to those skilled in the art, including distillation, reverse osmosis, electrolysis, evaporation, ion exchange, etc. The contaminated water is processed to produce a first effluent of relatively clean water which is useful for agricultural purposes, drinking water, industrial purposes, etc. The processing also produces a second effluent of waste water. The waste water is analyzed for hazardous materials to confirm that the waste water is safe to use. Thereafter, the waste water, comprising an aqueous solution of salts, is analyzed for individual amounts of sodium, calcium, and magnesium and total dissolved solids to determine the best application and the amount of solution to be applied to a particular soil. The waste water is then applied to soil by spraying from a truck, aircraft or the like to effectively control dust and/or stabilize the soil. Where the concentration of salts is not enough to meet the required needs in a single application, several applications of the waste water may be employed.

Figure 2:
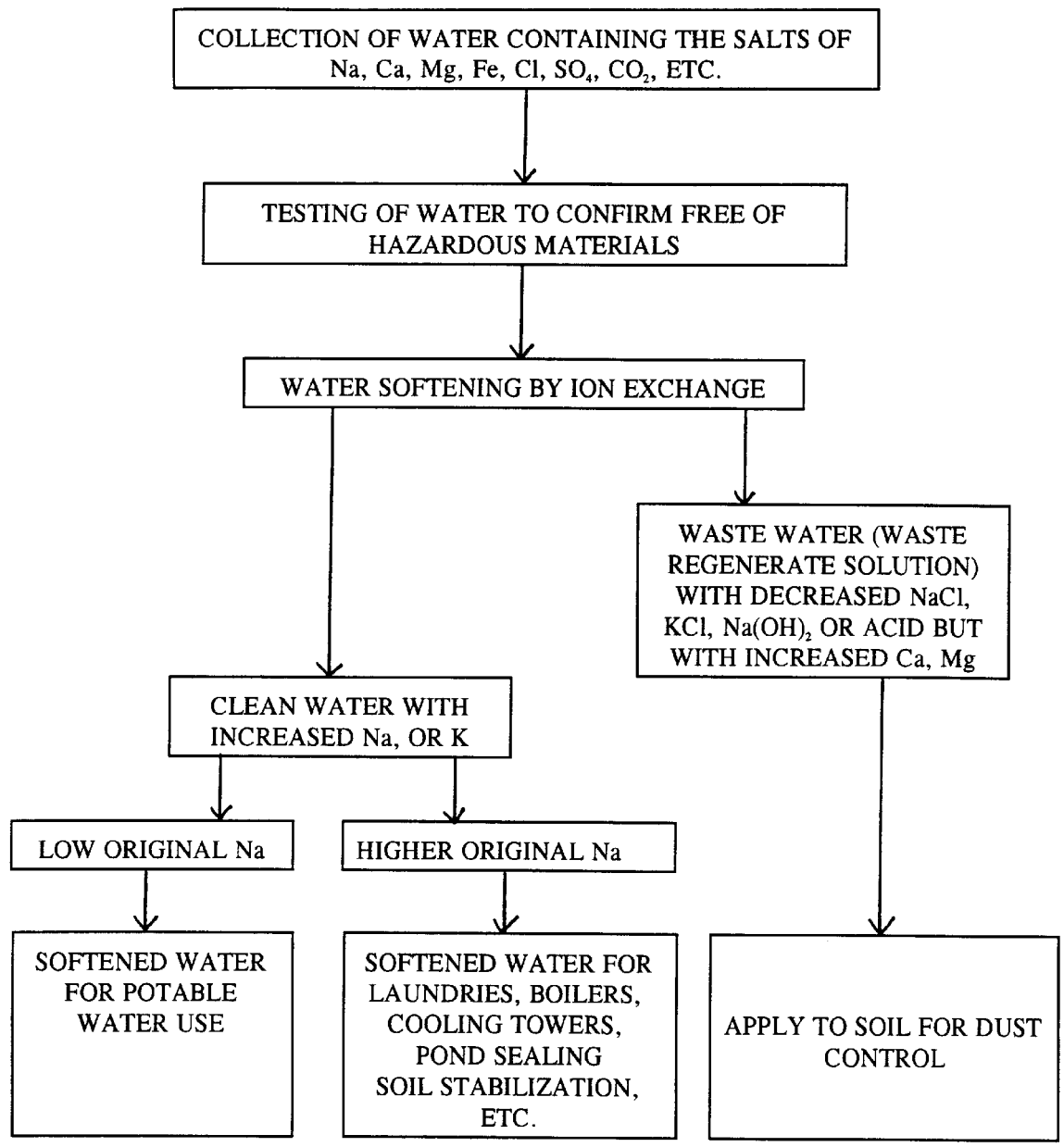
FIG. 2 is a flow chart of another preferred method of the invention.

With reference to FIG. 2, in a second preferred embodiment, water is collected which is contaminated with the salts of Na, Ca, Mg, Fe, Cl, $SO_4$, and $CO_3$. The water is then tested to confirm that it is free of hazardous materials. The contaminated water is then purified by ion exchange. As the name implies, the amount of salts in the effluents does not change. However, the cations are exchanged. By this process, a first effluent of clean water is produced having an increase in sodium or potassium. Where the contaminated water originally contained a low amount of sodium, it is preferred that this water be used for potable water. Meanwhile, where the contaminated water originally contained high sodium amounts, it is preferred that the clean water effluent be used for laundries, boilers, cooling towers, pond sealing and soil stabilization. These applications are typically more tolerant of waters having high sodium content, as long as the magnesium and calcium content remains low. These uses are listed in order of suitability as the sodium increases. As shown in FIG. 2, the water softening process by ion exchange also produces a waste water having decreased NaCl, KCl, $Na(OH)_2$ or acid, but having an increase in calcium and magnesium. For application of the present invention, this waste water is then applied to soil by spraying from a truck, aircraft or the like to control dust.

Figure 3:
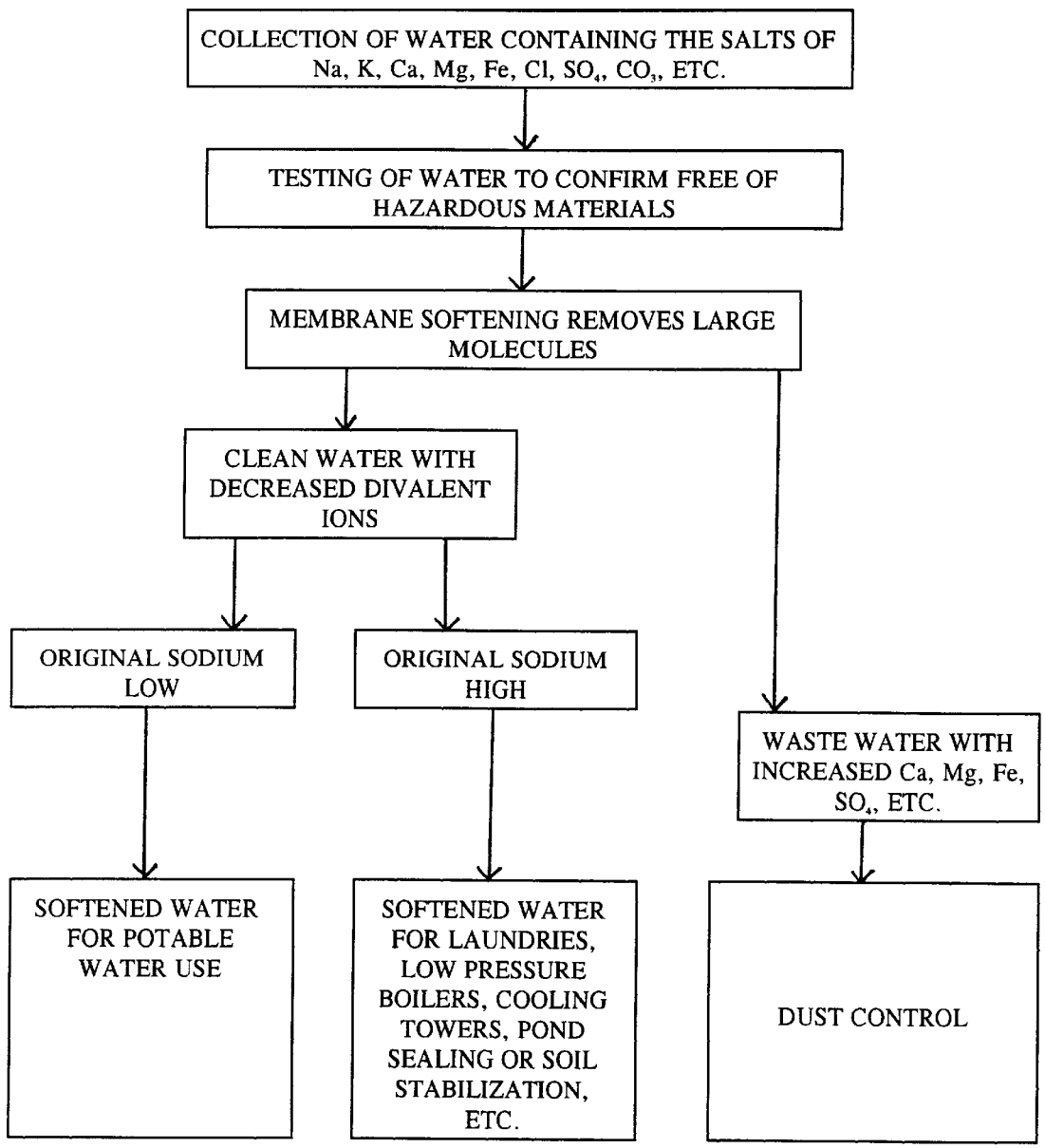
FIG. 3 is a flow chart of still another preferred method of the invention.

With reference to FIG. 3, in a fourth preferred embodiment, water is collected which is contaminated with the salts of Na, K, Ca, Mg, Fe, Cl, $SO_4$, and $CO_3$. The water is then tested to confirm that it is free of hazardous materials. This contaminated water is then purified by a membrane system to remove large molecules. A first effluent of clean water having decreased multivalent ions is produced from the membrane softening process. Where the original sodium content of the contaminated water is relatively low, it is preferred that the clean water be used for potable water. Where the original sodium content of the contaminated water is relatively high, it is preferred that the clean water effluent be used for laundries, low pressure boilers, cooling towers, pond sealing and soil stabilization. The membrane system also creates a waste water having significant calcium, magnesium, iron, sulfates, etc. For application of the present invention, it is preferred that this waste water be applied to soil by spraying from a truck, aircraft, or the like to effectively control dust.

Figure 4:
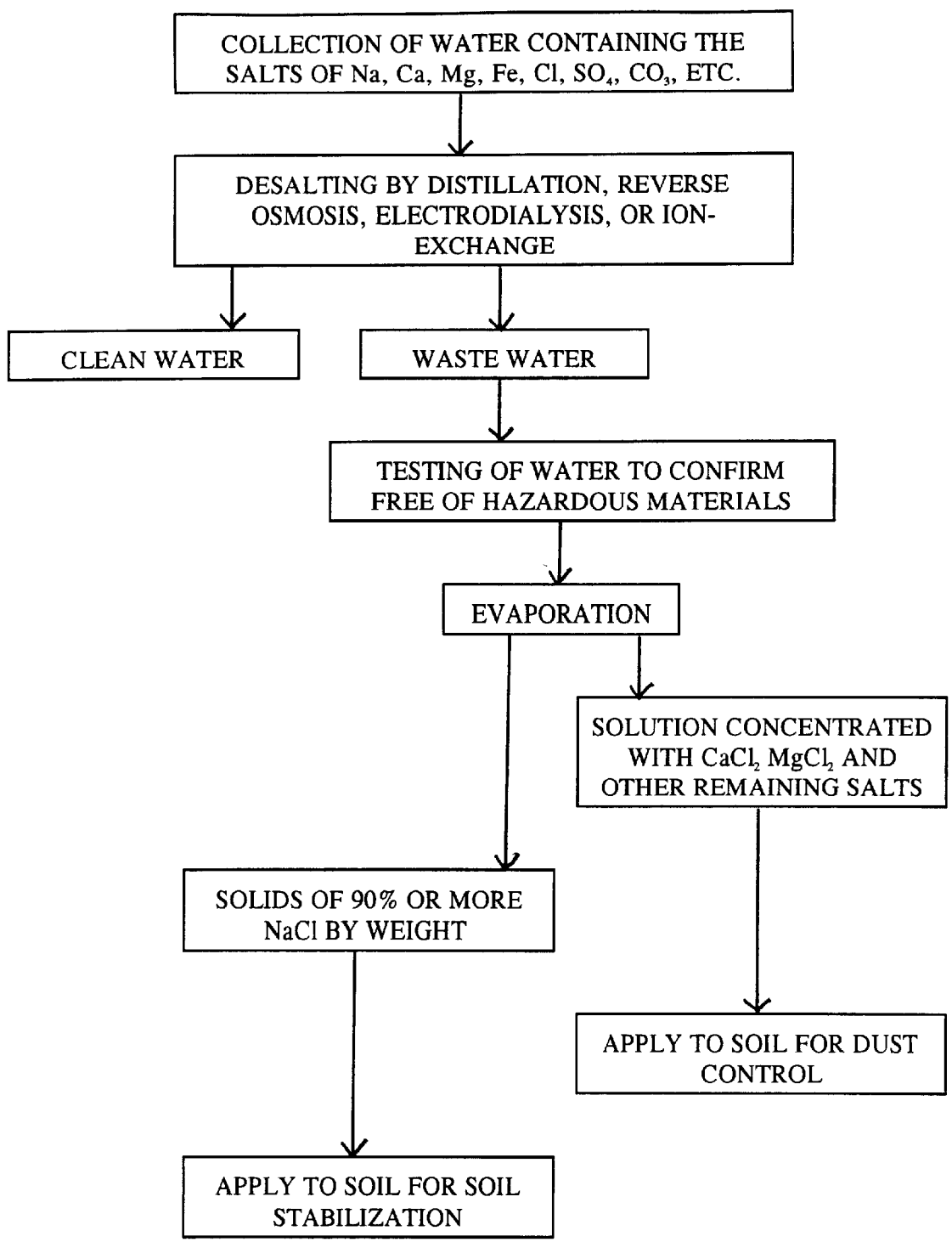
FIG. 4 is a flow chart of a preferred method of the present invention including evaporation to produce substantially solid sodium chloride.

As shown in FIG. 4, in a fourth embodiment of my invention, water contaminated with the salts of Na, K, Ca, Mg, Fe, Cl, $SO_4$, and $CO_3$ is collected. The contaminated water is desalted to produce a first effluent of relatively clean water, and a second effluent of waste water. The second effluent of waste water undergoes further evaporization processing to produce a first product of 90% or more NaCl, and a third effluent solution of substantially saturated $CaCl_2$ and $MgCl_2$. For practice of the invention, the NaCl is then applied to soil to effect soil stabilization. Meanwhile the third effluent solution of mixed $CaCl_2$ and $MgCl_2$ is applied to soil to effect dust control.

As would be understood by those skilled in the art, the preferred amount of water and the percentage of salts contained therein to control dust and effect soil stabilization will vary greatly. Factors which will effect waste water applications include the chemical composition of the soil, the moisture in the soil, humidity, local rainfall, traffic conditions, etc.

Since the testing of soil is expensive, it is preferred that the waste water be applied in several applications. Waste water is applied and allowed to evaporate. The soil is examined to determine if sufficient waste water has been applied to control dust or stabilize the soil. These steps are repeated until sufficient salts have been applied to control dust or to stabilize the soil.

The embodiments described above will now be further explained in and by the following examples.

EXAMPLE 1

Approximately 2.7 miles of road in the Mojave Desert of California is treated with waste water containing approximately 12.5% total salts, and in particular, about 1.37% calcium chloride, 0.39% magnesium chloride and 10.7% sodium chloride. After treatment, the road underwent periodic truck traffic. Visual comparison of dust produced by truck traffic is measured against a section of road which has not been treated. Following a rain, dust starts to be visible from a one mile distance within 2–4 days for the untreated road, while dust starts to be visible from the one mile distance within 10–20 days for the treated section of road.

Thereafter, waste water applications are increased for a three month period. The amount per application is the maximum that the soil will absorb without turning muddy. Then, the applications are ceased. The road is examined over the next year and found not to exhibit any significant dusting. In addition, there is a distinct reduction of washboarding.

EXAMPLE 2

Approximately one mile of dirt road in the Mojave Desert is treated with a mixture of sodium, calcium and magnesium salts. Application of the untreated waste water proves effective for effecting soil stabilization. Compared to untreated sections of the dirt road, the soil is found to be more stable and less prone to being spread by rainfall, and is found to be much less prone to washboarding and potholing.

Figure 5:
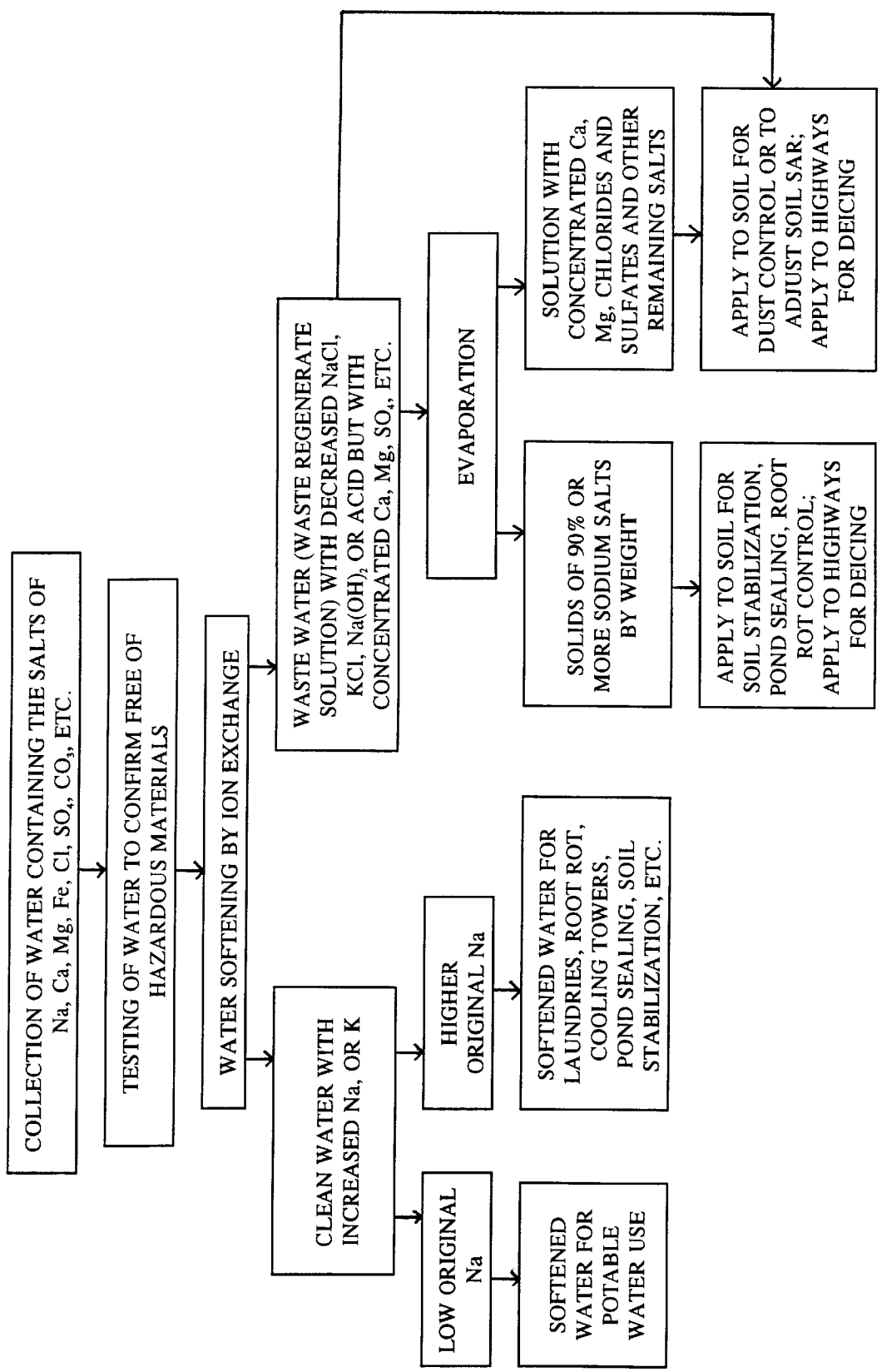
FIG. 5 is a flow chart illustrating a method of the present invention for applying softened waters for laundries, root rot, cooling towers, pond sealing and soil stabilization, and for applying waste waters for dust control and agriculture.

With reference to FIG. 5, in a fifth preferred embodiment of the present invention, water is collected which is contaminated with the salts of Na, K, Ca, Mg, Fe, Cl, $SO_4$, and/or $CO_3$. The contaminated water is then tested to determine that it is free of hazardous chemicals, and if the water is determined to sufficiently free of hazardous chemical, the water is purified by water softening, such as by ion exchange. As shown, ion exchange produces an first effluent of clean water which typically has a high sodium content. As explained with reference to FIG. 2, where the clean water has a low sodium content such as where the original contaminated water had a low sodium content, the water may be used for potable applications. Meanwhile, where the clean water has a high sodium content, the clean water may used for laundry applications, cooling towers, pond sealing and soil stabilization. The clean water having a high sodium content may also be applied to soil to inhibit root rot. The added sodium counterbalances any excess calcium in the soil to increase soil permeability and inhibit the buildup of carbon dioxide in the soil. Without the carbon dioxide in the soil, the root rot fungus either dies, or at least its growth is inhibited.

Still with reference to FIG. 5, the waste water produced by ion exchange typically has an increased level of calcium and magnesium. This waste water may be applied to soil to control excess soil dusting. In the alternative, where the soil at issue requires soil stabilization, pond sealing or root rot control, the waste water undergoes evaporation to produce solid NaCl which can be applied to the soil. Moreover, I have found that the waste water can be processed through evaporation, or in accordance with the methods disclosed in my U.S. Pat. No. 5,300,123, to produce substantially solid sodium salt which can be applied to roads to lower the freezing point of water on the roads. Meanwhile, the waste water having an increased level of calcium and magnesium can be applied directly to the soil, or concentrated through evaporation and then applied to soil, for irrigation purposes and for adjusting the soil's sodium absorption ratio (SAR). In addition, even though the calcium and magnesium solution is typically aqueous, it can also be applied to roads and highways to inhibit the formation of ice on the roads as calcium and magnesium salts also lower the freezing point of water. Thus, any water previously on the road will freeze at a lower temperature once mixed with the calcium and magnesium solution which has been produced as a result of evaporating the waste water.

Figure 8:
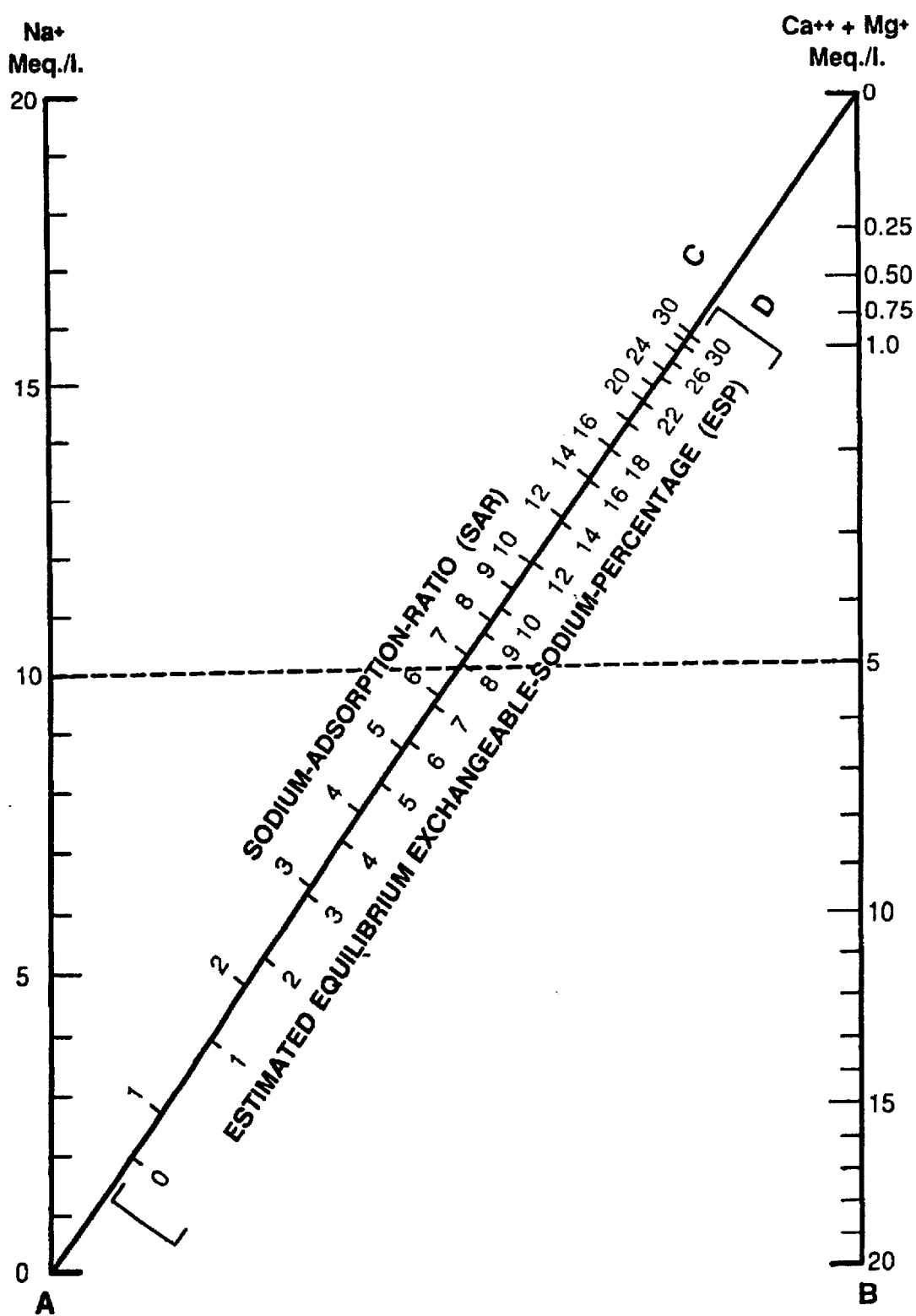
FIG. 8 is a chart illustrating the sodium absorption ratio (SAR) of irrigation waters.

All irrigated areas suffer from a buildup of sodium. Plant evaprotranspiration and plant growth use about 70 to 90% of the irrigation water and the sodium is concentrated in the remaining 10 to 30% of the water. This water must be washed from the roots or plant growth suffers. As shown in FIG. 8, the sodium buildup is predicted by the sodium absorption ratio (SAR) vs. the total of salinity of the irrigation water. To use the chart in FIG. 8, the sodium concentration is marked on the left side of the nomogram. The calcium plus magnesium concentration is then marked on the right side of the nomogram. Drawing a straight line between the two marks identifies the SAR value where the line intersects the sodium adsorption scale. Due to the inverse relationship between the addition of sodium to calcium and magnesium, an increase in calcium and/or magnesium will actually lower the SAR value of the irrigation water. With reference again to FIG. 5, by using the waste waters having a high calcium and magnesium content as irrigation water reduces the buildup of exchangeable sodium in the soil thereby maintaining the soil in proper sodium equilibrium.

Figure 6:
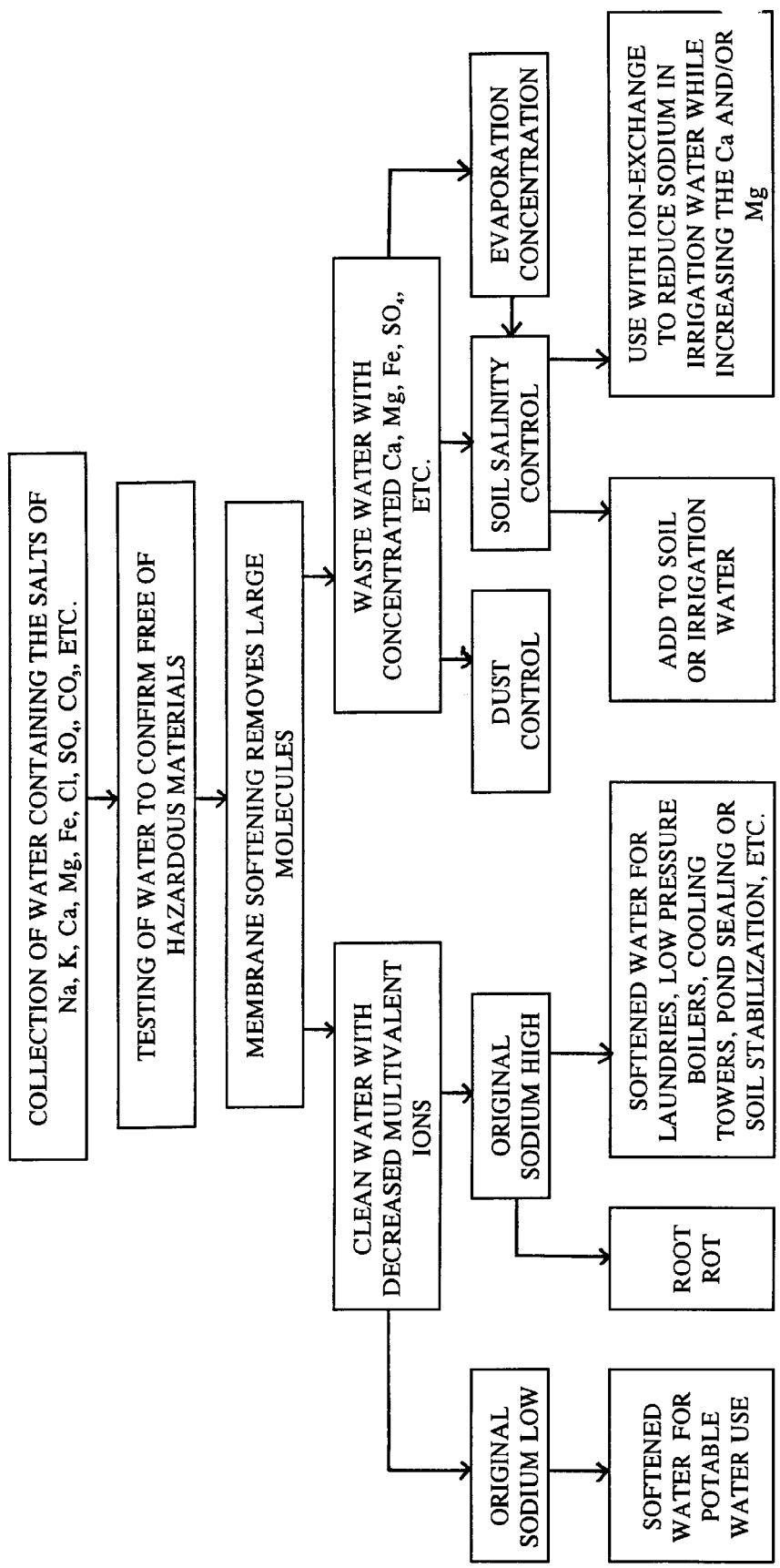
FIG. 6 is a flow chart illustrating a practice of the present invention including membrane softening to produce waste water for application to control dust, control soil salinity or irrigate soil.

With reference to FIG. 6, membrane softening also creates a first effluent of clean water and a second effluent of waste water. For practicing the present invention, the clean water is utilized for potable applications where the sodium is low, but used for laundry, low pressure boilers, cooling towers, pond sealing soil stabilization or treating root rot where the sodium is high. Meanwhile, the waste water from membrane softening typically has significant levels of calcium and magnesium. As discussed above, instead of simply disposing of these waters, it is preferred that these waste waters be used for dust control or for controlling the sodium level in the soil. As shown in FIG. 6, controlling the level of the sodium in the soil can be accomplished in one of two ways. The waste water can be applied directly to the soil to adjust the SAR, or the waste waters can be used in cooperation with ion exchange water softening processing to reduce the amount of sodium in irrigation waters. These irrigation waters, now lower in sodium, are applied to the soil to maintain the soil's sodium equilibrium level, or to leach out sodium from the soil to place the soil into a proper sodium equilibrium level.

Figure 7:
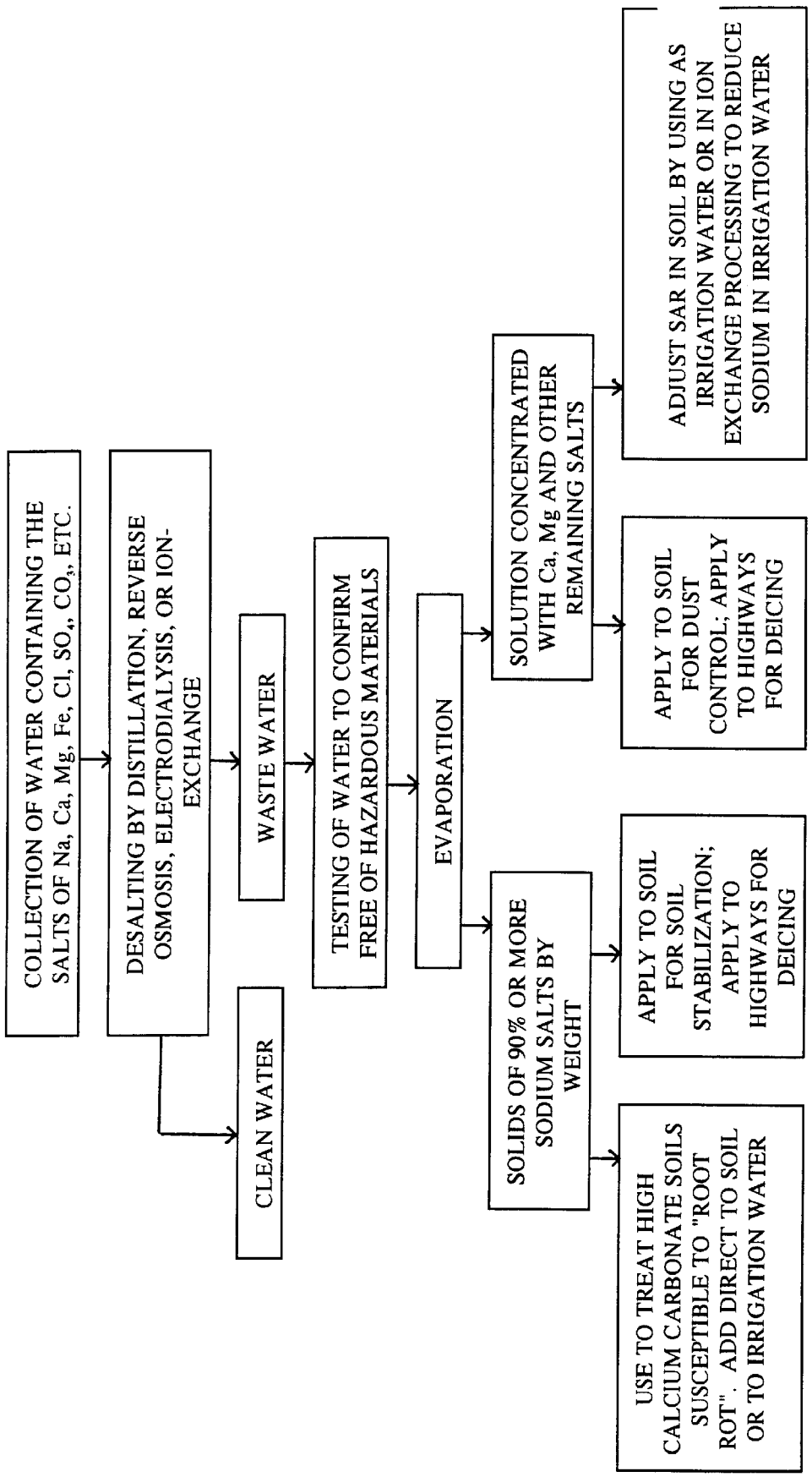
FIG. 7 is a flow chart illustrating a practice of the present invention including water purification to produce waste water for application to control dust and irrigate soil.

With reference to FIG. 7, for practicing an additional embodiment of the present invention, water that is contaminated with the salts of Na, K, Ca, Mg, Fe, Cl, $SO_4$, and $CO_3$ is desalted by distillation, reverse osmosis, electrodialysis or ion exchange to produce a first effluent of clean water and a second effluent of waste water. The waste water is preferably tested to ensure that it is free of hazardous materials. In a preferred practice of the present invention, the water undergoes evaporation to produce a substantially solid mixture and a solution concentrate. The substantially solid mixture is comprised primarily of sodium salts and is thus suitable for use as a soil stabilizer or for inhibiting root rot by directly applying the solid mixture to soil, or by adding the mixture to irrigation water. Moreover, for practicing the present invention, the solid mixture of sodium salts is also applied to roads and highways for deicing and for impeding the formation of ice on the roads and highways.

Meanwhile, evaporation concentrates the waste water to produce an aqueous concentrate of calcium and magnesium salts. The concentrated solution is applied to soil to reduce soil dusting or is applied to soil to adjust the soil's sodium adsorption rate. As described with reference to FIG. 6, the concentrate may be applied directly to soil or may be used to reduce the sodium content in the irrigation water through additional ion exchange processing. In the alternative, the concentrated solution of calcium and magnesium salts is applied to roads and highways for deicing and for impeding the formation of ice on the roads and highways.

Figure 9:
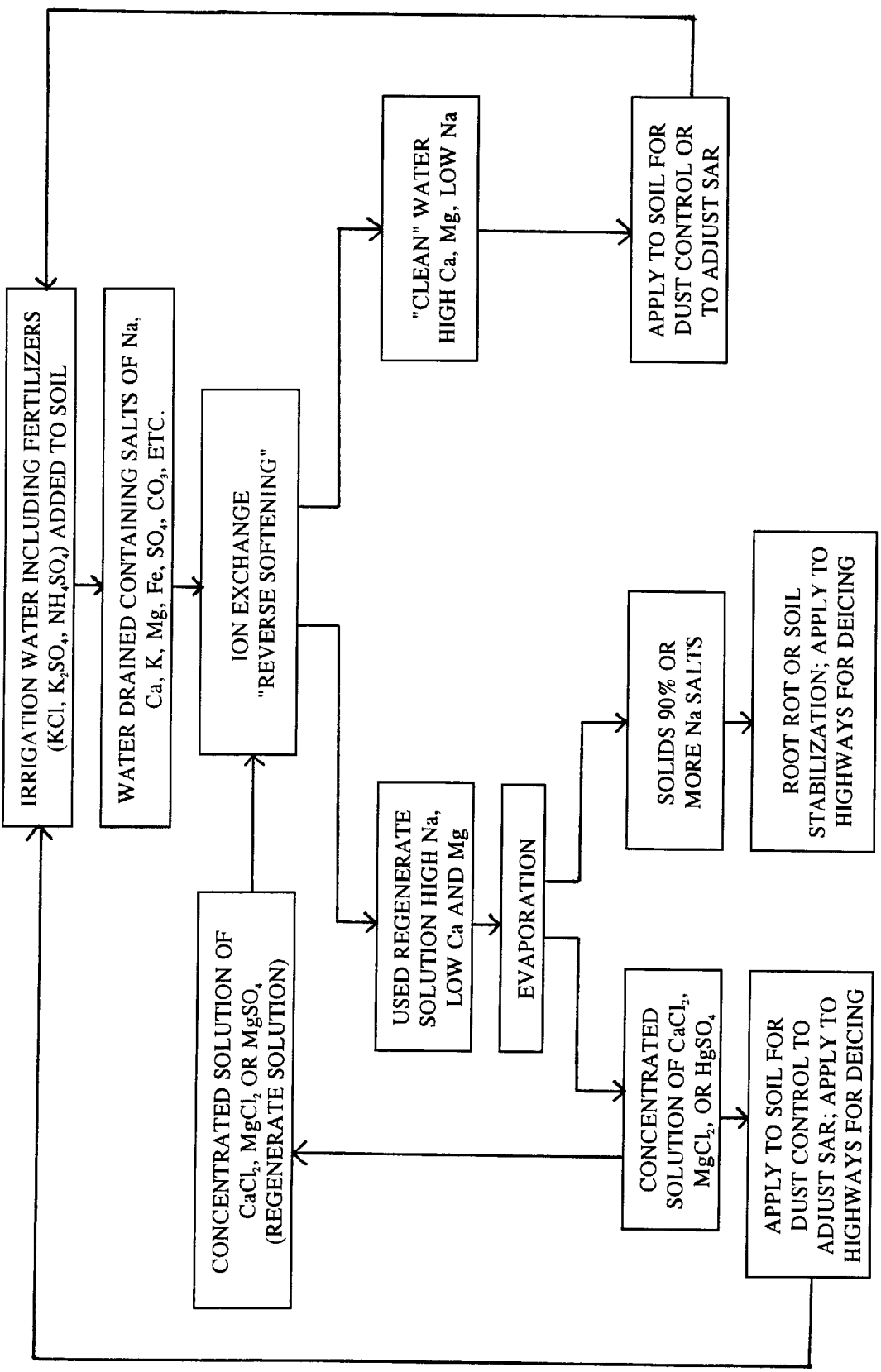
FIG. 9 is a flow chart illustrating a practice of the present invention including a closed loop system for treating soil.

With reference to FIG. 9, in still an additional embodiment of the present invention, a substantially closed loop system is provided for adjusting the properties of soil. As reflected in FIG. 9, farmers typically irrigate the soil while simultaneously adding to the soil significant levels of potassium chloride, potassium sulfate and ammonium sulfate as fertilizer. Over time, the addition of these fertilizers typically introduces substantial salts to the soil which must be leached out of the soil or drained from the soil such as by using pumps to maintain the soil at optimal conditions for agriculture. For practicing a preferred method of the present invention, the water drained from the soil is purified, such as by ion exchange reverse softening. For reverse softening, a solution of calcium chlorides, magnesium chlorides, and/or magnesium sulfates is prepared to create a regenerative solution, such as can be obtained as shown in FIG. 5. The reverse softening process produces a used regenerate solution having increased sodium but with reduced calcium and magnesium. The regenerate solution preferably undergoes evaporative processing producing a 90% solid mixture of sodium salts which is preferably used for treating root rot or for soil stabilization, depending on the properties of the soil at issue. Meanwhile, the evaporative process also creates a concentrated solution of calcium and magnesium salts. Where the soil suffers from dusting or requires adjustment of the soil's sodium adsorption rate, instead of applying the 90% solid mixture of sodium salts, this concentrated solution of calcium and magnesium salts is applied to the soil to reduce these problems. Still with reference to FIG. 9, the ion exchange process also creates a "clean" water effluent typically low in sodium salts but high in calcium and magnesium salts. Where the soil suffers from problems such as dust control or an improper sodium adsorption rate, as opposed to root rot or soil stabilization, this clean water effluent can also be applied to the soil to reduce these problems. The aforementioned process, thus, provides a substantially closed loop procedure for maintaining soil at desired equilibrium levels, notwithstanding that the soil may suffer from wildly divergent chemical problems.

Having described the invention in such terms as to enable one skilled in the art to make and use it and having identified the presently best mode of practicing it, I claim:

1. A method using an aqueous effluent comprising the steps of:

collecting waste water contaminated with the salts of Na, Ca, Mg, Cl, $SO_4$, or $CO_3$ or combinations thereof, the waste water being produced as a result of water purification of contaminated water which results in a first effluent of substantially clean water and a second effluent of waste water; and applying the waste water to soil to inhibit root rot.

2. The method of using an aqueous effluent of claim 1 wherein said waste water includes significant Na.

3. The method of using an aqueous effluent of claim 1 wherein the step of processing the contaminated water includes the step of water softening.

4. The method of using an aqueous effluent of claim 3 wherein the step of processing the contaminated water is by ion-exchange, precipitation, membrane softening or electrolysis.

* * * * *